(12) United States Patent
Featonby et al.

(10) Patent No.: US 9,127,977 B2
(45) Date of Patent: Sep. 8, 2015

(54) LEVEL MEASUREMENT APPARATUS

(75) Inventors: Paul David Featonby, Newcastle (GB);
Alan Roy Jones, Guisborough (GB);
Sara Hillary Margaret Gibson,
Saltburn-by-the-Sea (GB)

(73) Assignee: Johnson Matthey PLC, London (GB)

( * ) Notice: Subject to any disclaimer, the term of this patent is extended or adjusted under 35 U.S.C. 154(b) by 5 days.

(21) Appl. No.: 12/860,546

(22) Filed: Aug. 20, 2010

(65) Prior Publication Data

US 2011/0044427 A1 Feb. 24, 2011

(30) Foreign Application Priority Data

Aug. 20, 2009 (GB) .................................. 0914583.0

(51) Int. Cl.
*G01F 23/288* (2006.01)
*G01T 1/203* (2006.01)

(52) U.S. Cl.
CPC .............. *G01F 23/288* (2013.01); *G01T 1/203* (2013.01)

(58) Field of Classification Search
CPC .... G01N 23/06; G01N 23/10; G01F 123/288; G01T 1/20; G01T 1/203
USPC .......................................... 378/52; 250/357.1
See application file for complete search history.

(56) References Cited

U.S. PATENT DOCUMENTS

| | | | | | |
|---|---|---|---|---|---|
| 2,857,522 | A | * | 10/1958 | Jones | 250/256 |
| 2,933,601 | A | * | 4/1960 | Friedman | 250/357.1 |
| 3,062,957 | A | * | 11/1962 | Youmans | 250/267 |
| 3,654,458 | A | * | 4/1972 | Burrus et al. | 378/52 |
| 4,296,321 | A | * | 10/1981 | Blincow et al. | 250/254 |
| 4,638,159 | A | * | 1/1987 | Nunley | 250/267 |
| 4,698,748 | A | * | 10/1987 | Juzswik et al. | 713/322 |
| 6,548,814 | B1 | * | 4/2003 | Gronli | 250/357.1 |
| 2002/0130258 | A1 | * | 9/2002 | Odom et al. | 250/269.6 |
| 2004/0025569 | A1 | * | 2/2004 | Damm et al. | 73/32 R |
| 2004/0128098 | A1 | | 7/2004 | Neuhaus | |
| 2008/0142718 | A1 | | 6/2008 | Mormann et al. | |

(Continued)

FOREIGN PATENT DOCUMENTS

| | | |
|---|---|---|
| CN | 201096508 Y | 8/2008 |
| DE | 20103881 U1 | 6/2001 |
| EP | 0 971 243 A1 | 1/2000 |

(Continued)

OTHER PUBLICATIONS

Anonymous: "Gammapilot M FMG60" Endress+Hauser, [Online] Sep. 30, 2008, pp. 1-40.

(Continued)

*Primary Examiner* — Glenn Kao
(74) *Attorney, Agent, or Firm* — RatnerPrestia

(57) ABSTRACT

The invention provides a detector assembly for use in a nucleonic level gauge comprising:
  a) at least one radiation detector;
  b) electronic apparatus for controlling the at least one detector and processing the electronic signals produced by the at least one detector; and
  c) a photomultiplier;
wherein all of said components (a)-(c) are capable of being enclosed in an elongate, radiation-permeable housing having a cross-sectional area which is substantially uniform along the length of the housing. A detector apparatus may contain a plurality of such detector assemblies contained within a single housing. The detector is preferably an elongate plastic scintillator.

31 Claims, 2 Drawing Sheets

(56) References Cited

U.S. PATENT DOCUMENTS

2009/0114012 A1    5/2009  Becherer et al.
2010/0252739 A1*  10/2010  Damm et al. .............. 250/357.1

FOREIGN PATENT DOCUMENTS

| GB | 627557 | 8/1949 |
| GB | 2147696 A | 5/1985 |
| WO | WO-99/17085 A1 | 4/1999 |
| WO | WO-2004/088684 A2 | 10/2004 |
| WO | WO-2009/060070 A1 | 5/2009 |
| WO | WO 2009060070 A1 * | 5/2009 |

OTHER PUBLICATIONS

European Search Report dated Dec. 8, 2010.

* cited by examiner

LEVEL MEASUREMENT APPARATUS

CROSS-REFERENCE TO RELATED APPLICATIONS

This application claims priority of British Patent Application No. 0914583.0, filed Aug. 20, 2010, the disclosure of which is incorporated herein by reference in its entirety for all purposes.

FIELD OF THE INVENTION

The present invention relates to an apparatus and method for measuring the level of a material within a vessel.

BACKGROUND OF THE INVENTION

The measurement of levels of fill, particularly of fluids including liquids, gases and fluid multi-phase materials such as emulsions and slurries has been carried out for many years, using nucleonic level gauges, by measuring the amount of radiation emitted by a radiation-source which is detected at one or more levels within the vessel. The radiation is attenuated as it passes through materials; the amount of attenuation being related to the density of the materials between the source and a detector. From comparing the attenuation of radiation detected at different levels of the vessel, it is possible to estimate the height of materials contained in the vessel. Such gauges often comprise a source of gamma radiation of sufficient energy to penetrate the vessel walls, if required, and to traverse the material in the vessel as far as the detector(s). The detectors may comprise one or more Geiger-Müller (GM) tubes or a scintillation detector. For example U.S. Pat. No. 3,654,458 describes the detection and control of a liquid level in a sub-sea vessel using a source of ionising radiation and a plurality of detectors.

In typical level gauges, the detector or detectors are arrayed along a linear axis, usually contained within a radiation-permeable casing, and deployed so that the detector array extends generally vertically with respect to the vessel so that, in operation, the level to be measured is located between the first and last detectors of the array. When a single elongate scintillation detector is used it is deployed in a similar fashion so that the level to be measured typically is located between the ends of the scintillator. These typical prior art arrangements are illustrated schematically in FIG. 1. The detectors are controlled and data is collected using electronic data processing and control apparatus which is usually housed in a housing which is of relatively large cross section compared with that of the detector array and normally located at one end of the detector. In the case of a scintillation detector, the housing also contains a photomultiplier, and a voltage converter to produce the high voltages required to operate the photomultiplier. The invention provides an improved detector apparatus for use in a nucleonic level gauge.

SUMMARY OF THE INVENTION

According to the invention a detector assembly for use in a nucleonic level gauge comprises:
a) at least one scintillation detector for detecting radiation;
b) electronic apparatus for controlling the at least one detector and processing the electronic signals produced by the at least one detector; and
c) a photodetector;

wherein all of said components (a)-(c) are capable of being enclosed in an elongate, radiation-permeable housing having a cross-sectional area which is substantially uniform along the length of the housing.

By substantially uniform, we mean that the cross sectional area does not vary by more than 10% along the length of the housing, and preferably by less than 5%. In a preferred embodiment, the cross sectional area is the same, within normal mechanical tolerances, along the length of the housing. The diameter of the housing is preferably less than about 200 mm and more preferably less than 100 mm.

The cross-section may be any shape, but in a preferred embodiment it is circular, because this shape can be made strong and resistant to pressure. A significant benefit of using a detector apparatus housing of uniform cross-section is that the housing can be fabricated using fewer welds and is, as a consequence, likely to be lighter and simpler to fabricate.

BRIEF DESCRIPTION OF THE DRAWINGS

The invention will be further described with reference to the accompanying drawings, which are.

DETAILED DESCRIPTION OF THE INVENTION

Figure 1:
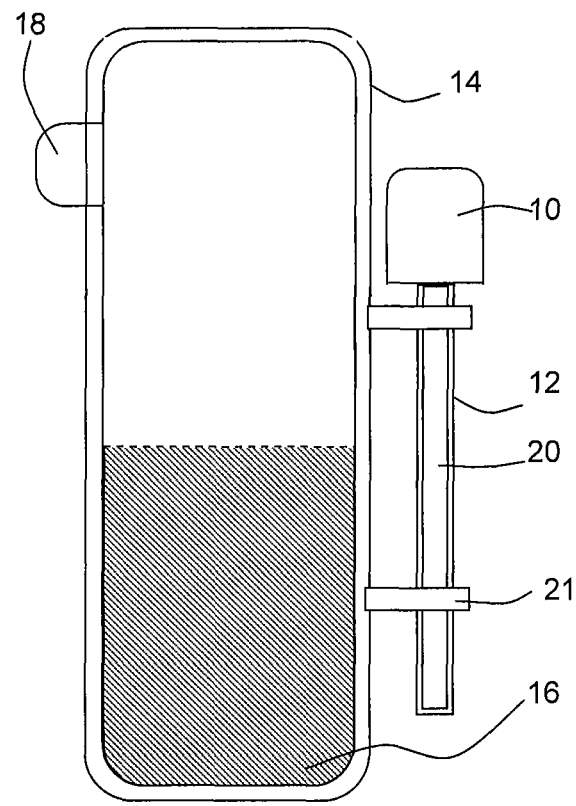
FIG. 1: A schematic view of a prior art detector assembly for a level gauge.

The radiation detector may comprise one or more elongate scintillator materials. Such materials, which emit light in response to interaction with gamma radiation, are well known for use as radiation detectors. A polymeric or plastic scintillator is preferred in this embodiment. Plastic scintillators are well known and typically comprise a solution of an organic scintillator in a solvent which is subsequently polymerized to form a solid. Some of the common solutes are p-Terphenyl, PBD (2-(4-Biphenylyl)-5-phenyl-1,3,4-oxadiazole), b-PBD (butyl PBD), PBO (2-Phenyl-5-(4-biphenyl)-oxazole), POPOP (1,4-bis(5-phenyloxazol-2-yl)benzene). The most widely used plastic solvents are polyvinyltoluene and polystyrene. The scintillation material may be any length which is suitable for use in the particular level measurement application for which the detector apparatus is designed. Typically, the material is from about 500 mm to 3000 mm in length but may be longer or shorter. The scintillator preferably has a square or rectangular cross section, having a largest dimension which is sized to enable the scintillator to fit inside a circular-section housing. Using a square-section scintillator in a circular-section housing leaves space for cables or connectors to be run alongside the scintillator material. The arrangement of an elongate plastic scintillator within a housing wherein a cable is run along at least a part of the length of the scintillator to connect between detectors is believed to be new. The space between the detector assembly components and the housing may be filled with a filler material such as a plastic in the form of pieces or as a moulded filler. The space may also contain an inert gas. Alternatively, the scintillator may have another cross-sectional shape, for example it may have a cross-section which is a similar shape to that of the housing.

The apparatus comprises a photodetector, which may be a photomultiplier or photodiode, for detecting light emitted by the scintillator and which produces a measurable voltage in response to the incident photons. The photodetector is coupled to the scintillator by known methods. A preferred type of photodetector is a photomultiplier. Photomultiplier circuits generally require a high-voltage (typically in the range 1000-2000 V) for their operation. This contributes to the requirement, in prior art apparatus, for a large end housing in order that the heat generated by the high-voltage generator can be satisfactorily dissipated. It is a feature of our invention that, in a preferred embodiment the apparatus comprises a low-power, high-voltage generator. The low-power, high-voltage generator preferably consumes <0.5 W of power and more preferably <0.1 W. Use of a low-power, high-voltage generator enables the housing to be smaller such that the whole apparatus can be contained within a smaller housing because the heat generation is less than with prior art devices.

The apparatus comprising the detector(s), photo-detector, voltage-converter and electronic apparatus is housed within the housing which is closed with a lid for protection. The total length of the interior of the housing is generally greater than the length of the apparatus contained within it in order to allow for thermal expansion and contraction. A spring is preferably located between the apparatus and the housing so that the detector is held in engagement with the photomultiplier and away from the end of the housing.

The electronic apparatus comprises a signal processing unit for smoothing and/or averaging and/or applying compensating calculations (e.g. for temperature or pressure) to the signal produced by the photomultiplier, using known signal processing algorithms. A data processing unit calculates the amount of radiation received at one or more locations on the detector or detector array. The data processing unit may also calculate the location of a level or phase change in the contents of a vessel from the amount of radiation received by the detector but this calculation and related duties such as outputting the information to a suitable user interface may be carried out remotely from the detector apparatus. The apparatus therefore further comprises means to send a signal or data from the detector apparatus to a user interface. The operation of the detector(s) and signal/data processing units is controlled using a programmable control unit, also located within the housing. The electronic components may be encapsulated within a gas-proof material in order to minimise the risk of explosion in hazardous areas. The use of a low-power high voltage generator also contributes to the ability to use the apparatus in hazardous areas and enables the detector apparatus to be designed as an intrinsically safe apparatus.

In a second embodiment, the detector apparatus according to the invention comprises:
i. an elongate housing and
ii. two or more detector assemblies, each comprising
  a) at least one radiation detector;
  b) electronic apparatus for controlling the at least one detector and processing the electronic signals produced by the at least one detector; and
  c) a photodetector;
wherein said detector assemblies are arranged in series.

The use of more than one detector assembly enables the effective length of the detector apparatus to be greater than that of a single detector assembly. When using a scintillator as a radiation detector, the effective length of a single detector assembly is limited by the available scintillator lengths. Although it is possible to join lengths of scintillator material together, the use of a detector apparatus according to this embodiment of the invention avoids the need to do so whilst providing a method of fabricating long detectors from pre-fabricated detector assemblies. In preferred embodiments, the radiation detector comprises a plastic scintillator.

The detector assemblies may each be enclosed in a radiation-permeable housing, preferably of substantially uniform cross-section. In a preferred embodiment, the detector assemblies are all contained in a single housing, which preferably has a cross-sectional area which is substantially uniform along the length of the housing. The single housing is preferably constructed using as few parts as possible in order to avoid welds and other potential weak spots caused by joining components. It is preferred to provide a housing for the detector assemblies which is constructed as a unitary piece, for example constructed from a single pressure-rated pipe. The detector assemblies are preferably located in the housing in series. The detector assemblies may each be of approximately the same length or they may be of different lengths. When a detector assembly has its electronic components and/or photomultiplier at an end of the assembly, it is possible to arrange two adjacent detector assemblies so that their electronic components are adjacent, their radiation detectors are adjacent or a radiation detector end is adjacent to an electronic component end. A different arrangement may be used depending on the use for which the detector is designed. For example, it may be preferred to place the radiation detectors of adjacent detector assemblies together so that a dead-spot resulting from the location of the electronics can be placed away from the central portion of the detector, where it may be required to be more sensitive. Each detector assembly may be contained within an inner casing which is provided with means to enable electrical signals to pass to and from the enclosed detector assembly. The housing may be closed with a lid.

The detector assembly may form part of a level gauge, which is used to measure the level of fill of a material in a vessel, comprising a radiation detector apparatus and a source of penetrating radiation. The detector assembly may be mounted on or in a vessel in a position spaced away from the source of penetrating radiation in such a way that radiation emitted from the source passes through at least a portion of the vessel where the level is to be measured and can be detected by the detector assembly. The radiation preferably comprises ionising radiation such as X-rays or, more preferably, gamma rays. The radiation used is selected by the transparency to the radiation of the vessel and/or its contents, i.e. the attenuation coefficient of the medium, and the availability of suitable sources and detectors. For penetrating large solid structures such as process vessels, gamma radiation is greatly preferred. Suitable sources of gamma include $^{60}$Co and $^{137}$Cs, $^{133}$Ba, $^{241}$Am, $^{24}$Na and $^{182}$Ta, however any gamma-emitting isotope of sufficient penetrating power could be used, and many such sources are already routinely used in level measurement devices. For a permanent installation, a radioisotope source should be chosen to have a relatively long half life both to give the equipment a satisfactory service life and to reduce the need to recalibrate to take account of reduction in source intensity from source ageing. The half lives of the radioisotopes mentioned above are: $^{137}$Cs gamma ca. 30 years, $^{133}$Ba ca. 10 years and $^{241}$Am ca. 430 years. Suitable sources emit radiation at energies between about 40 and 1500 keV and suitable detectors can detect such radiation with sufficient sensitivity that the radiation detected varies according to the density of the transmission medium.

The detector apparatus may be provided with mounting means such as a bracket, flange, etc. by which it may be mounted either outside or inside a vessel, using methods which are known.

FIG. 1 shows a prior art detector assembly for a level gauge. The detector assembly comprises a top housing 10, containing the control and data-processing electronics and also the power source; and an elongate housing 12 containing a plastic scintillation detector 20 arranged along the housing. The detectors are mounted on a circuit board. The detector assembly is shown mounted on a vessel 14 containing a fluid 16, by means of brackets 21, opposite a radiation source 18.

Figure 2:
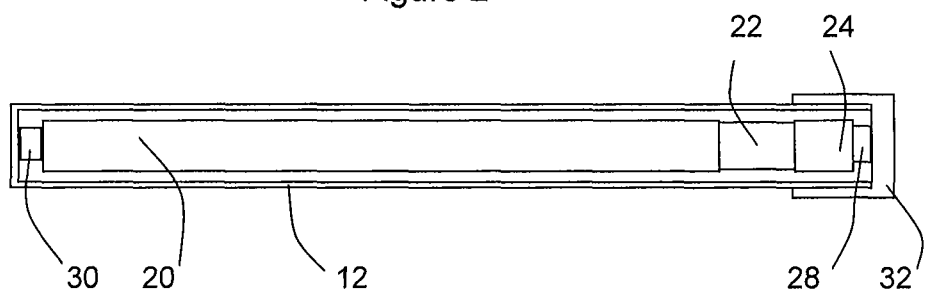
FIG. 2: A longitudinal section through a detector assembly for a level gauge according to one embodiment of the invention.

FIG. 2 shows a section through a detector assembly according to one embodiment of the invention. The detector 20 is a square-section elongate plastic scintillation detector material which is coupled to a photomultiplier (PM) tube 22. Close engagement between the PM tube and the scintillator is assured by springs 30 and 28, which also allow for some thermal expansion and contraction of the components and or housing. The electronic components 24 include one or more microprocessors for signal processing, data processing and control functions and also a low power high voltage power source which is capable of powering the PM tube. All of the components are housed within a housing 12 which has a circular cross-section and essentially uniform diameter. The housing is closed with a suitable lid 32.

Figure 3:
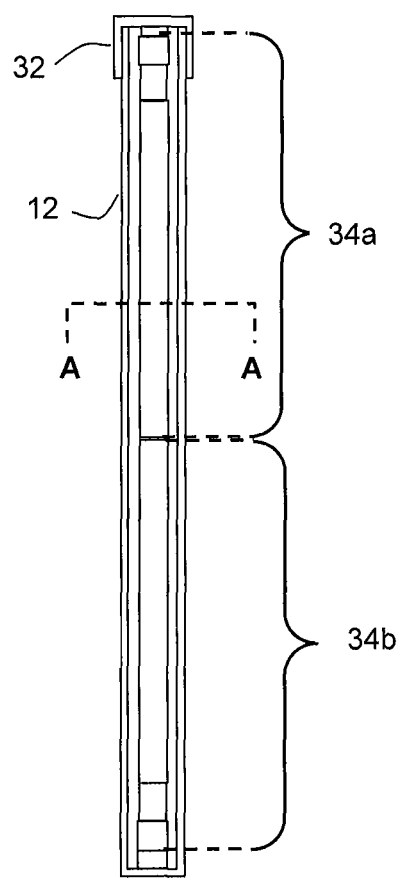
FIG. 3: A longitudinal section through a composite detector assembly for a level gauge according to another embodiment of the invention.
Figure 4:
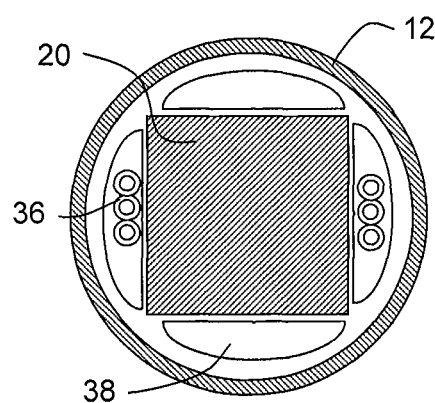
FIG. 4: A transverse section through the gauge shown in FIG. 3 at line A-A.

FIG. 3 shows a section through a composite detector assembly according to another embodiment of the invention. Cylindrical housing 12 contains two individual detector assemblies, 34a and 34b, each comprising a scintillator, PM tube, microprocessors and power source as described in relation to FIG. 2. The detector assemblies are arranged within the housing so that their scintillators extend from the respective PM tubes towards each other. The housing 12 is closed by lid 32. FIG. 4 is a transverse cross-section through line A-A of FIG. 3 showing how the square 35 section scintillator material 12 fits into the circular section housing with space for cables 36 to be run alongside the scintillator. Plastic moulded packing 38 holds the contents in place and protects the scintillator and other components.

What is claimed:

1. A radiation detector apparatus for use in a nucleonic level gauge comprising a detector assembly and an elongate housing with a circular cross-sectional area which is substantially uniform along the length of the housing, the detector assembly comprising:
   a) at least one scintillation detector comprising a plastic scintillator in the shape of an elongate rod having a square or rectangular cross-section for detecting radiation;
   b) an electronic apparatus for controlling the at least one scintillation detector and processing the electronic signals produced by the at least one scintillation detector; and
   c) a photodetector;
   wherein all of said components (a)-(c) are configured for installation in the housing, and
   wherein the housing is radiation-permeable, and wherein said detector assembly is contained in said housing.

2. A radiation detector apparatus according to claim 1, wherein the electronic apparatus uses less than 2 W power.

3. A radiation detector apparatus according to claim 1, wherein a cable is present between said at least one scintillation detector and said housing.

4. A radiation detector apparatus according to claim 3, wherein the cable runs along at least part of the length of the at least one scintillation detector within an annular space between the at least one scintillation detector and the housing.

5. A radiation detector apparatus according to claim 1, wherein said housing contains at least two detector assemblies.

6. A radiation detector apparatus according to claim 5, wherein said at least two detector assemblies are arranged substantially coaxially.

7. A radiation detector apparatus according to claim 5, wherein said at least two detector assemblies are arranged in series.

8. A radiation detector apparatus according to claim 5, wherein two adjacent detector assemblies are arranged so that their electronic apparatuses are adjacent each other.

9. A radiation detector apparatus according to claim 5, wherein two adjacent detector assemblies are arranged so that their scintillation detectors are adjacent each other.

10. A radiation detector apparatus according to claim 5, wherein two adjacent detector assemblies are arranged so that the electronic apparatus of one detector assembly is adjacent the scintillation detector of another detector assembly.

11. A radiation detector apparatus according to claim 5, wherein at least one cable, capable of carrying electrical signals and power to and from at least one of the detector assemblies, passes between at least one of said scintillation detectors and said housing along at least a portion of the length of the scintillation detector.

12. A level measurement apparatus comprising a radiation detector apparatus according to claim 1 and a source of penetrating radiation which is detectable by said radiation detector apparatus, said source and radiation detector apparatus being mounted on or in a vessel in a position spaced away from each other in such a way that radiation emitted from the source passes through at least a portion of the vessel where a level of material is to be measured and can be detected by the radiation detector apparatus.

13. A level measurement apparatus according to claim 12, wherein said source is a source of gamma radiation.

14. A radiation detector apparatus according to claim 1, further comprising at least one power source which is contained in said housing, wherein said power source comprises a low-power, high-voltage generator which consumes <0.5 W of power and which is capable of powering the photodetector.

15. A radiation detector apparatus according to claim 1, wherein said housing has a diameter less than about 200 mm.

16. A radiation detector apparatus according to claim 1, wherein the plastic scintillator comprises a solidified polymer containing an organic scintillator, the polymer selected from the group consisting of polyvinyltoluene and polystyrene and the organic scintillator selected from the group consisting of p-Terphenyl, PBD (2-(4-Biphenylyl)-5-phenyl-1,3,4-oxadiazole), b-PBD (butyl PBD), PBO (2-Phenyl-5-(4-biphenyl)-oxazole), and POPOP (1,4-bis(5-phenyloxazol-2-yl)benzene).

17. A radiation detector apparatus according to claim 1, wherein said plastic scintillator has a length of about 500 mm to 3000 mm.

18. A radiation detector apparatus according to claim 1 further comprising a plurality of spaces between the housing and the plastic scintillator, the spaces having a cross-section of a circular segment.

19. A radiation detector apparatus according to claim 18, wherein at least one cable occupies at least one of the plurality of spaces, the at least one cable configured to carry at least one of electrical signals and power to and from the detector assembly.

20. A radiation detector apparatus according to claim 18, wherein said housing contains at least two detector assemblies and the at least one cable is configured to carry at least one of electrical signals and power to and from the detector assemblies.

21. A radiation detector apparatus according to claim 18, wherein a filler occupies at least one of the plurality of spaces.

22. A radiation detector apparatus according to claim 18, wherein an inert gas occupies at least one of the plurality of spaces.

23. A radiation detector apparatus according to claim 1 further comprising a spring located between the at least one scintillation detector and the housing so that the at least one scintillation detector is held in engagement with the photodetector and away from the end of the housing.

24. A radiation detector apparatus according to claim 1, wherein the photodetector is a photomultiplier or a photodiode.

25. A radiation detector apparatus according to claim 1, wherein the housing comprises a single pressure rated pipe and a lid.

26. A radiation detector apparatus, comprising an elongate, radiation-permeable housing having a circular cross-sectional area which is substantially uniform along the length of the housing and at least two detector assemblies, all said detector assemblies being contained in said housing and each said detector assembly comprising:
   a) at least one scintillation detector for detecting radiation, said scintillation detector comprising a plastic scintillator in the shape of an elongate rod having a square or rectangular cross-section;
   b) electronic apparatus for controlling the at least one detector and processing the electronic signals produced by the at least one detector; and
   c) a photodetector which is coupled to said plastic scintillator,
   wherein said at least two detector assemblies are arranged in the housing in series.

27. A radiation detector apparatus according to claim 26, further comprising at least one power source which is contained in said housing, wherein said power source comprises a low-power, high voltage generator which consumes <0.5 W of power and which is capable of powering the photodetector.

28. A radiation detector apparatus according to claim 26, wherein at least one cable, capable of carrying electrical signals and power to and from at least one of the detector assemblies, passes between at least one of said scintillation detectors and said housing along at least a portion of the length of the scintillation detector.

29. A radiation detector apparatus according to claim 26, wherein two adjacent detector assemblies are arranged so that theft electronic apparatuses are adjacent each other.

30. A radiation detector apparatus according to claim 26, wherein two adjacent detector assemblies are arranged so that their scintillation detectors are adjacent each other.

31. A radiation detector apparatus according to claim 26, wherein two adjacent detector assemblies are arranged so that the electronic apparatus of one detector assembly is adjacent the scintillation detector of another detector assembly.

* * * * *